US012712655B2

(12) United States Patent
Arrano Scharager et al.

(10) Patent No.: US 12,712,655 B2
(45) Date of Patent: Aug. 18, 2026

(54) COMMUNICATION METHOD AND DEVICES OF A WIRELESS COMMUNICATION NETWORK

(71) Applicant: Orange, Issy-les-Moulineaux (FR)

(72) Inventors: Hernan Felipe Arrano Scharager, Châtillon Cedex (FR); Marceau Coupechoux, Châtillon Cedex (FR); Jean-Marc Kelif, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 778 days.

(21) Appl. No.: 17/432,662

(22) PCT Filed: Feb. 19, 2020

(86) PCT No.: PCT/FR2020/050308
§ 371 (c)(1),
(2) Date: Aug. 20, 2021

(87) PCT Pub. No.: WO2020/169926
PCT Pub. Date: Aug. 27, 2020

(65) Prior Publication Data

US 2022/0173823 A1 Jun. 2, 2022

(30) Foreign Application Priority Data

Feb. 22, 2019 (FR) ...................................... 1901833

(51) Int. Cl.
*H04L 61/58* (2022.01)
*H04J 11/00* (2006.01)
(Continued)

(52) U.S. Cl.
CPC ........ *H04J 11/0056* (2013.01); *H04L 1/0003* (2013.01); *H04L 1/0026* (2013.01); *H04W 24/10* (2013.01)

(58) Field of Classification Search
CPC ... H04L 1/0003; H04L 1/0009; H04L 1/0026; H04L 1/0023; H04B 7/0452; H04B 7/022; H04J 11/0056; H04W 24/10
See application file for complete search history.

(56) References Cited

U.S. PATENT DOCUMENTS

2007/0249347 A1* 10/2007 Saifullah ............. H04W 36/302 455/436
2014/0218465 A1* 8/2014 Bright-Thomas ...... H04N 7/152 348/14.09

(Continued)

FOREIGN PATENT DOCUMENTS

EP 3416344 A1 12/2018
WO WO 2015060510 A1 4/2015

OTHER PUBLICATIONS

International Search Report and Written Opinion dated May 6, 2020 for Application No. PCT/FR2020/050308.

(Continued)

*Primary Examiner* — Anez C Ebrahim
(74) *Attorney, Agent, or Firm* — Knobbe, Martens, Olson & Bear, LLP

(57) ABSTRACT

Communication method and devices of a wireless communication network comprising a first access point to the network and at least one second access point to the network, the first access point generating, when communicating on a downlink channel established with a first terminal, an interference signal affecting at least one communication from the at least one second access point on at least one uplink channel established with at least one second terminal are described. The communication method can be implemented by a first device of a wireless communication network and includes sending via the first device of the network to the at least one second access point at least one datum represen- (Continued)

tative of a set of transmission parameters used by the first access point when communicating with the first terminal on the downlink channel.

18 Claims, 5 Drawing Sheets

(51) Int. Cl.
*H04L 1/00* (2006.01)
*H04W 24/10* (2009.01)

(56) References Cited

U.S. PATENT DOCUMENTS

2017/0149967 A1* 5/2017 Chandrasekaran ..... H04L 67/54
2018/0091282 A1 3/2018 Lim et al.
2018/0213390 A1* 7/2018 Vesterinen ............ H04W 8/082

OTHER PUBLICATIONS

Li Rongpeng et al. "A Tomography of Full-Duplex Cellular Networks" 2017 IEEE 85$^{th}$ Vehicular Technology Conference (VTC Spring), IEEE, Jun. 4, 2017 (Jun. 4, 2017), pp. 1-7 DOI: 10.1109/VTCSPRING .2017 .8108362.

* cited by examiner

[Fig. 1]
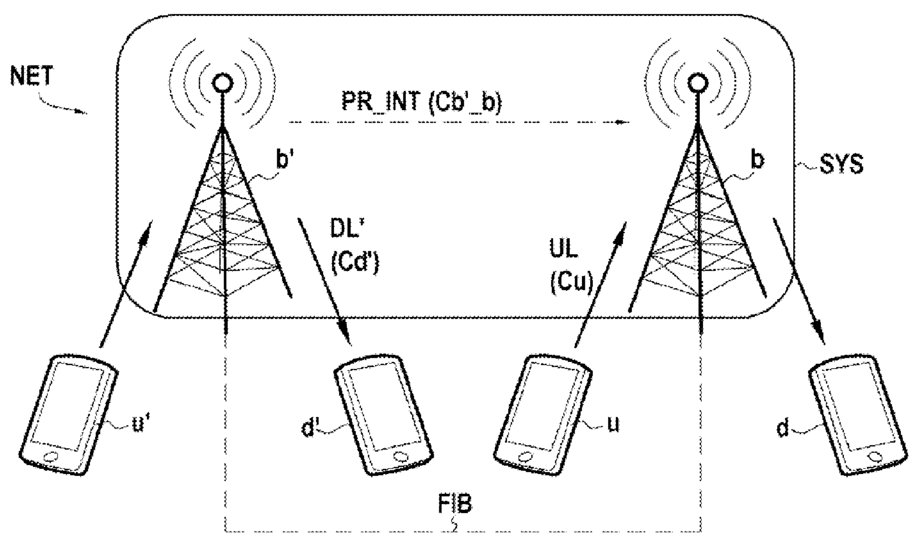
[Fig. 2]
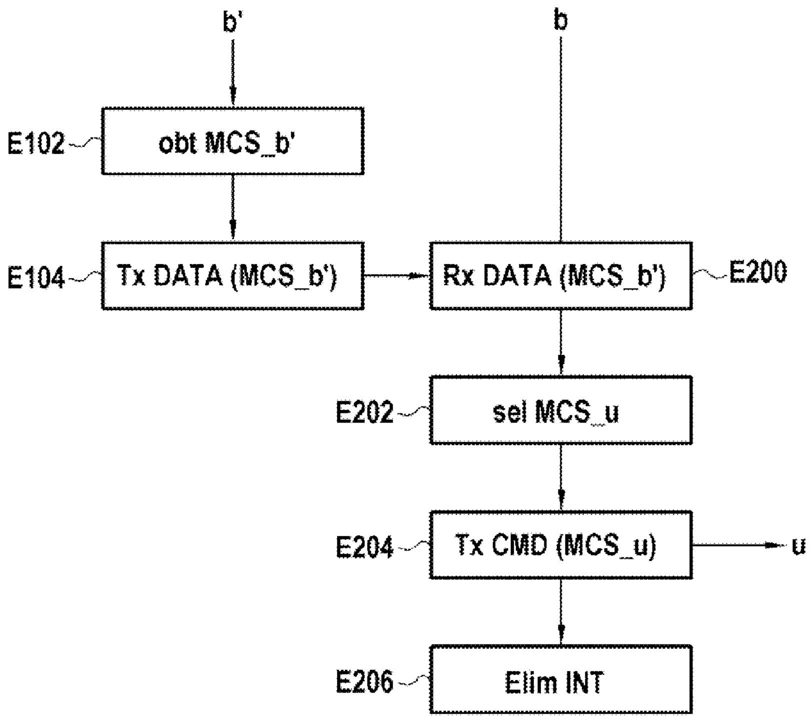

[Fig. 3]
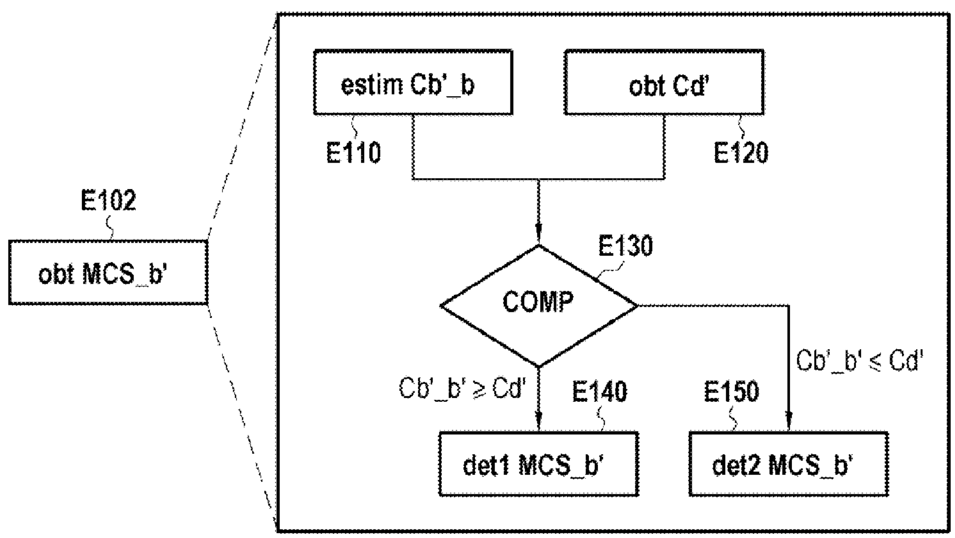
[Fig. 4]
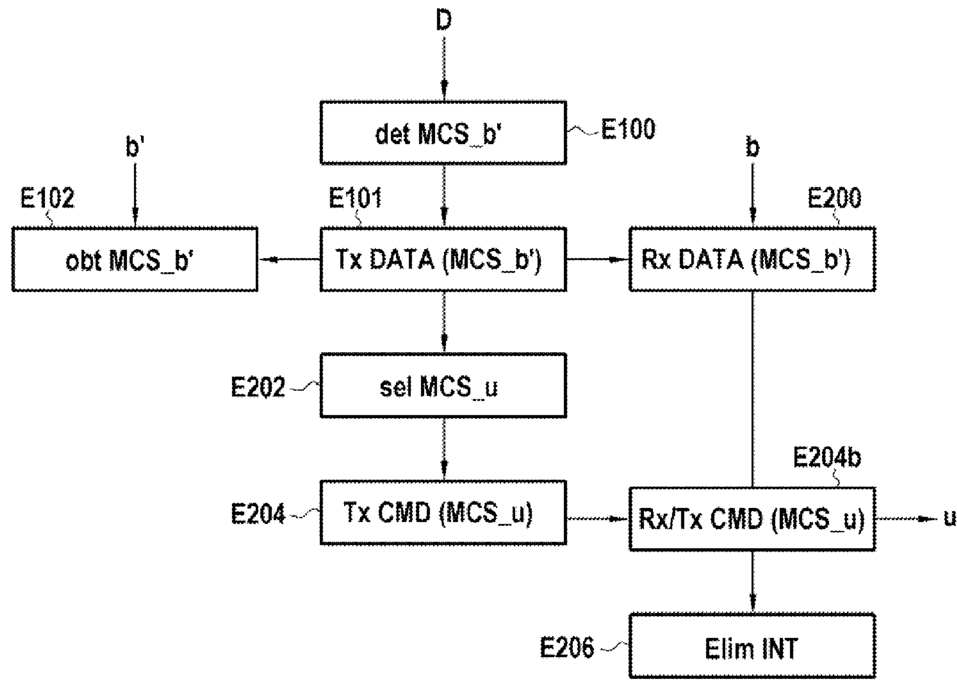

[Fig. 5]
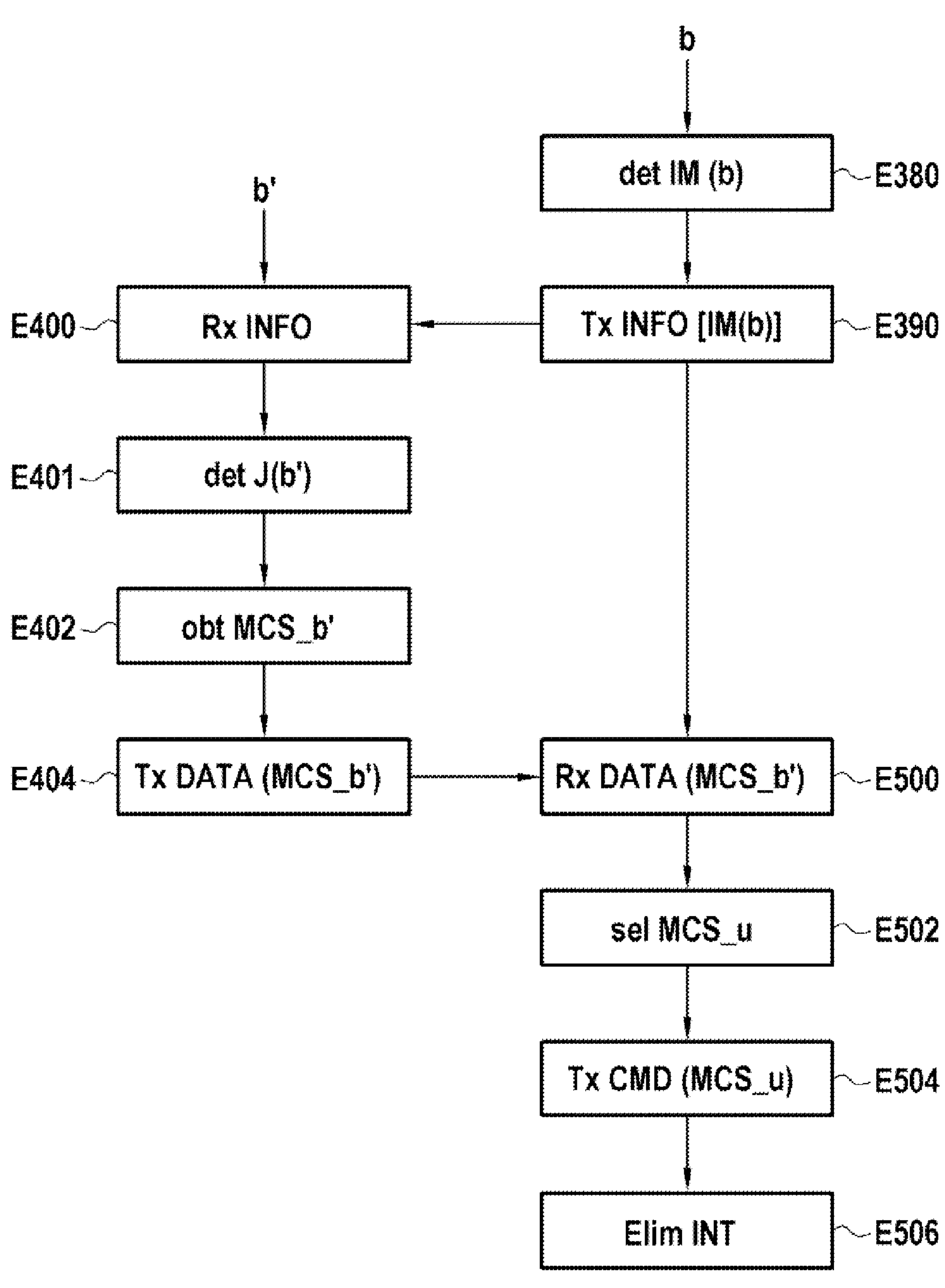

[Fig. 6]
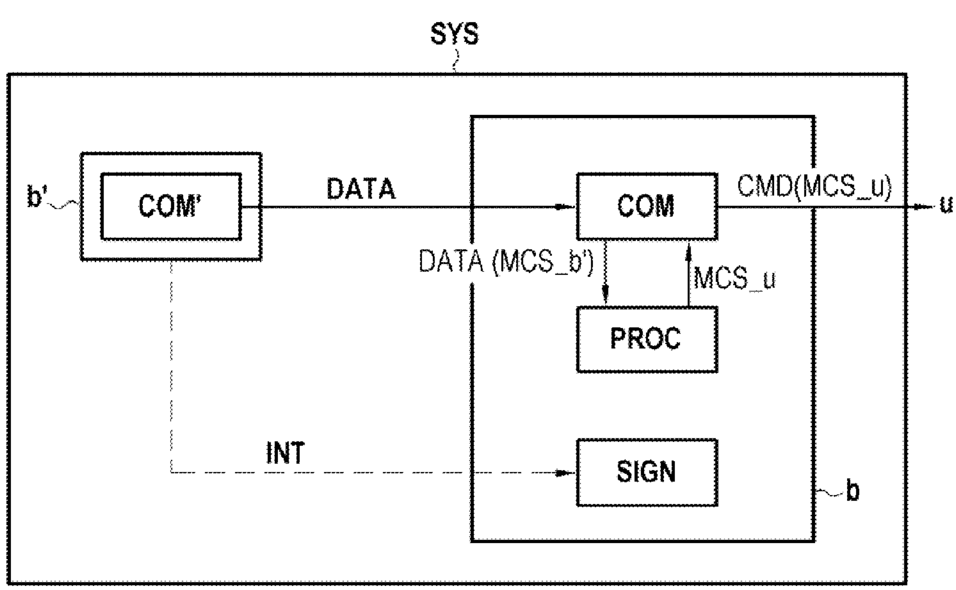

[Fig. 7]
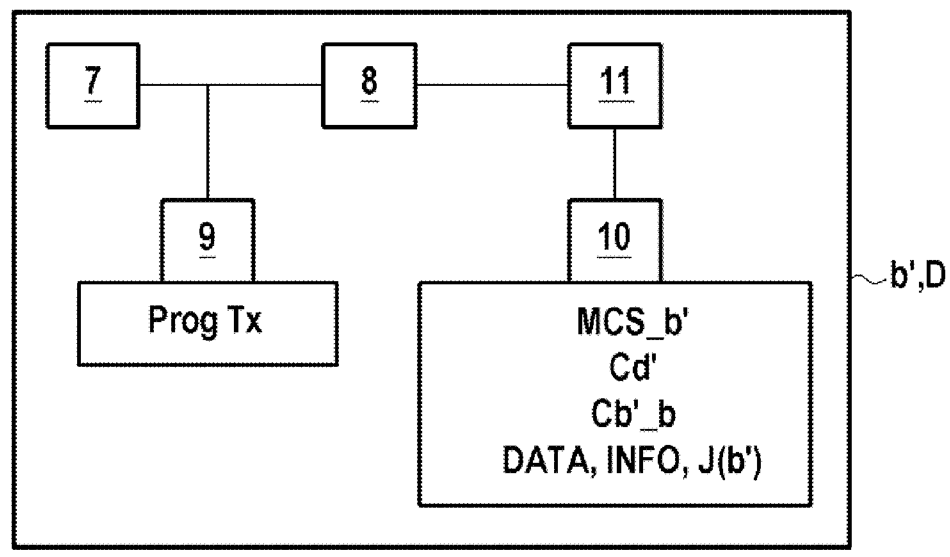
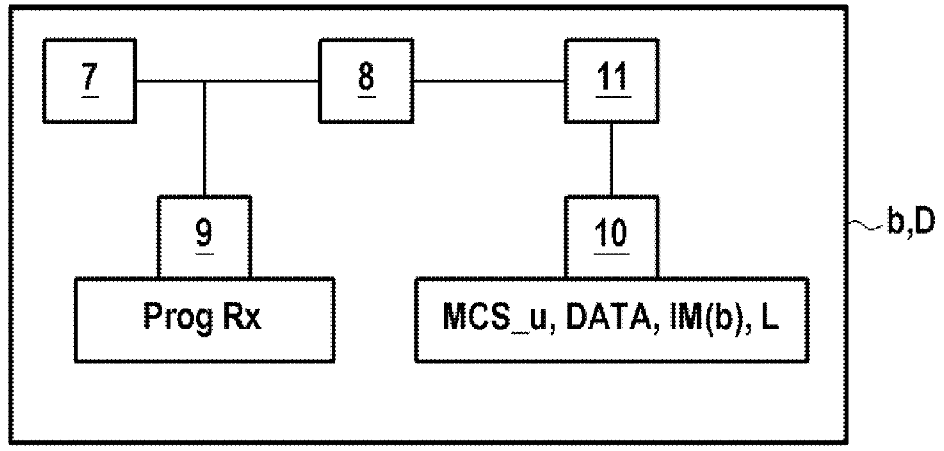

COMMUNICATION METHOD AND DEVICES OF A WIRELESS COMMUNICATION NETWORK

RELATED APPLICATIONS

This application is the U.S. National Phase of Application No. PCT/FR2020/050308 entitled "INTERFERENCE REDUCTION FROM A FIRST ACCESS POINT BY A SECOND ACCESS POINT USING A DATUM REPRESENTATIVE OF TRANSMISSION PARAMETERS" and filed Feb. 19, 2020, which claims the benefit of French Patent Application No. 1901833, filed Feb. 22, 2019, each of which is incorporated by reference in its entirety.

PRIOR ART

The invention relates to the general field of telecommunications.

It more specifically offers a solution allowing an access point to a wireless communication network to limit (reduce or suppress), in the signals it receives on the uplink from terminals that are connected to it, the interference caused by other network access points when the latter communicate on the downlink. Such interference is for example caused by the use on the downlink via these other access points of the same radio resources as said terminals. A radio or communication resource within the sense of the invention may denote any type of resource that can be used by a terminal or by a network access point to carry data over this network, such as for example a frequency, a frequency band, a wavelength, a time interval, a pair composed of a frequency and a time interval, etc.

The term "uplink" or "uplink channel" is here understood to mean a communication channel connecting a terminal to an access point to the wireless communication network under consideration that the terminal uses to send data to the access point.

Similarly, the term "downlink" or "downlink channel" is understood to mean a communication channel connecting a terminal to an access point to the wireless communication network to a terminal that the access point uses to send data to the terminal.

The invention is notably advantageously applicable when at least a part of the access points to the communication network uses a Full Duplex communication mode. In a manner known per se, a communication device operating in full duplex mode can send and receive data using the same radio resources, for example one and the same time-frequency resource (also commonly denoted Resource Block (RB)).

However, no limitation is attached to the wireless communication network to which the invention can be applied (for example a 4G or 5G cellular network, a WiFi (Wireless Fidelity) network etc.) or to the nature of the access point used to access this network (for example a base station, an eNodeB station etc.).

The use of full duplex communication techniques in theory makes it possible to double the spectral efficiency that can be achieved over the communication network with respect to the Half Duplex (HD) mode. In practice, when such FD techniques are used, for example in a cellular communication network, the gain obtained on the downlink is more limited, and uplink losses can even be observed, due to the interference created by the devices of the network (terminals and/or access points) which use the same radio resources to communicate over the network.

Specifically, in a wireless communication network different types of interference can affect the data transmissions made on the uplink between a terminal and an access point to the network to which the terminal is connected. More particularly, this so-called "co-channel" interference can be broken down into the following types:

- a first type of interference created by the signals transmitted on the uplink by other terminals using the same communication resource or resources, these other terminals being able to be connected to the same access point as the terminal in question or other access points of the network;
- a second type of interference created by the signals transmitted on the downlink by the same access point to which the terminal in question is connected; this interference is more commonly called "self-interference"; and
- a third type of interference coming from the signals emitted by another access point than that to which the terminal is connected and which uses on the downlink the same radio resources as the terminal uses on the uplink.

It is possible to dispel the second type of interference (i.e. "self-interference") in different ways, such as for example via an appropriate configuration of the transmission and reception antenna at the access point (for example by ensuring a certain separation between the antennas), the use of appropriate filters and/or materials in antenna circuits etc.

Given the emissive powers applied in practice at the level of the terminals and at the access points (the emissive powers applied at the access points, such as base stations, being far greater than those applied at the terminals), the first type of interference can be neglected with respect to the third type of interference. The invention therefore more specifically addresses the case of the third type of interference.

As mentioned previously, the presence of this interference strongly limits the benefits provided on the uplink in terms of spectral efficiency by the use of the full duplex communication mode, or even prevents such benefits from being obtained. Note that this type of interference does not only affect the communication networks implementing a full duplex communication mode but concerns any communication network in which the simultaneous use of one and the same radio resource on the uplink and on the downlink (for example by different access points) is permitted.

To palliate the aforementioned drawback, a first approach proposed in the prior art consists in limiting the number of network access points that can function simultaneously in full duplex. However, this first approach, if it does indeed make it possible to reduce the interference created on the uplink, irrevocably manifests as a limitation of the gain that can be obtained owing to full duplex mode, due to the limitation of the number of access points that can implement this mode of communication.

A second approach consists in using full duplex mode only in particular situations in which the co-channel interference undergone on the uplinks is weak, such as for example in cells of small dimensions (micro-cells). This second approach unfortunately reduces the opportunities to use full duplex mode. In particular, it excludes the use of full duplex mode in the case of a macro-cellular configuration or a heterogenous configuration.

There is therefore a need for a mechanism making it possible to reduce the impact of co-channel interference of the third type and thereby make it possible to benefit, particularly on the uplink, from a gain in terms of spectral efficiency due to the use of a full duplex communication mode or more generally the simultaneous use of the same radio resources on the uplink and downlink.

SUMMARY OF THE INVENTION

The invention relates to a method of communication by a so-called "first device" of a wireless communication network comprising a first access point to the network and at least one second access point to the network, the first access point generating during a communication over a downlink channel, set up with a first terminal, an interference signal affecting at least one communication of said at least one second access point over at least one uplink channel set up with at least one second terminal, the method comprising a step of sending by the first device of the network to said at least one second access point of at least one item of data representing a set of transmission parameters used by the first access point during said communication with the first terminal over the downlink channel.

Correlatively, the invention relates to a device, the so-called "first device" of a wireless communication network comprising a first access point to the network and at least one second access point to the network, the first access point generating, during a communication over a downlink channel set up with a first terminal, an interference signal affecting at least one communication of said at least one second access point over at least one uplink channel set up with at least one second terminal, the first device of the network, comprising a communication module configured to send to said at least one second access point at least one item of data representing a set of transmission parameters used by the first access point during said communication with the first terminal over the downlink channel.

Within the meaning of the invention the term "network device" is understood to refer to a radio access network device strictly speaking; thus, the first network device informing the second access point can for example be the first access point itself or be comprised (e.g. embedded) in this first access point, or in a variant, in a centralized operation mode, it can be a central network management entity controlling the different network access points and able to communicate with these access points, such as a management or control entity for a centralized access network of C-RAN (Centralized-Radio Access Network or Cloud-RAN) type.

No limitation is attached to the configuration of the network. This can be composed of one or more (sub-) networks, managed by a single operator or by different operators, using the same access technology or different access technologies.

Note that neither is any limitation attached to the way in which the second access point is informed by the first device of the network of the data representing the transmission parameters of the first access point. Thus for example, the first device of the network can broadcast the data relating to the transmission parameters used by the first access point on its downlink channel over the whole network or to the neighboring access points of the first access point or to those it deems liable to undergo interference generated by the first access point.

Within the meaning of the invention, the data representing the set of transmission parameters can be of different kinds. Thus, for example, it can be transmission parameters directly, transmitted unencoded, or parameters that have undergone a processing, such as for example a compression or encryption, or else an item of information used to unambiguously access the transmission parameters such as for example a memory address from which these parameters can be consulted or one or more associated indices via predefined rules of correspondence with the transmission parameters. Of course, other types of data can be envisioned as a variant.

The features and advantages of the communication method according to the invention given below apply to the first network device according to the invention and vice versa.

As mentioned previously, no limitation is attached to the nature of the communication network under consideration. Thus, in accordance with the invention, the first and second access point can be access points to a WiFi (Wireless Fidelity) network, access points to a LiFi (Light Fidelity) network, Remote Radio Headers (RRH) equipping a node B for $3^{rd}$-generation (3G) cellular networks or an evolved B node (eNodeB) for $3^{rd}$-generation (3G), $4^{th}$-generation (4G) or fifth-generation (5G) cellular networks etc.

Moreover, in accordance with the invention, the first and second access point can be of the same kind or different kinds, such as a $3^{rd}$-generation (3G) RRH and an eNodeB (4G).

The invention thus proposes that the transmission parameters used on the downlink by a first access point to the communication network liable to create interference on signals received by a second access point are communicated to the latter. Using its knowledge of these parameters, the second access point can attempt to eliminate or at least reduce the interference caused by the first access point, for example using an interference cancellation technique such as a successive interference cancellation technique known per se.

Specifically, the transmission parameters communicated to the second access point define the data transmission scheme chosen for use over a transmission downlink channel given by the first access point for communicating with a terminal to which it is connected. These parameters may for example comprise a modulation scheme, an encoding scheme (for example channel encoding, encoding used to multiplex data etc.) and/or a power level. These examples are only given for illustration purposes and other transmission parameters can be envisioned within the scope of the invention.

Moreover, when the second terminal emits toward the second access point over the uplink channel a so-called "useful" signal conveying data, the so-called "total" signal which is then received by the second access point comprises said useful signal along with one or more interference signals comprising various contributions coming from the downlink communications of the network devices (including where applicable the second access point itself). This interference particularly includes the co-channel interference mentioned previously related to the use of the same radio resources on the uplink and on the downlink by different access points of the network; the invention preferably applies when the first access point uses, during said communication over the downlink channel, a resource used by said at least one second access point during said at least one communication over said at least one uplink channel. However, the invention is also applicable to interference generated by the use of adjacent or neighboring radio resources, but also more distant resources due, for example, to the presence of imperfections due to saturation of power amplifiers or errors in signal filtering. These types of interference, as mentioned previously, are generated by the first access point by applying the transmission parameters sent to the second access point.

To simplify the terminology used in the rest of the description, and somewhat inaccurately from a linguistic point of view, the first access point is described as an "interferer" access point for the second access point, and the second point is described as an "interfered" access point by the first access point.

Using its knowledge of the transmission parameters applied by the first access point when it generates the interference signal, the second access point can therefore easily detect, in the total signal it has received, the contribution related to the interference created by the first access point, and attempt to eliminate this interference by means of an appropriate interference cancellation technique making use of these transmission parameters, such as for example a successive interference cancellation technique per se.

By proceeding in this way for the different access points of the network liable where applicable to interfere the useful signal coming from the second terminal at the second access point (typically in a multi-cellular situation), or at least for a selection of access points (for example the most powerful access points), it is possible to improve the overall spectral efficiency of the network owing to the use of shared resources on the uplink and on the downlink.

In a network implementing full duplex communication mode at its access points, the invention moreover makes it possible to approach the theoretical gain offered by the use of this mode of communication, and particularly the spectral efficiency of the network on the uplink.

It should be noted that although the invention is described with reference to full duplex communication mode and is very advantageously applicable to this communication mode, it can also be appliable, as described in more detail later, when the communication network is implementing a Half Duplex communication mode.

Moreover, the invention is applicable to any type of cellular network topology, i.e. homogenous with respect to the size of the cells (for example, to a micro-cellular topology or a macro-cellular topology) or heterogenous (i.e. comprising cells of different sizes such as for example micro-cells or macro-cells). The invention makes it possible to use full duplex mode and benefit from a gain in matters of spectral efficiency (in particular on the uplink) via the use of this mode, not only in a micro-cellular configuration as in the prior art but also in a macro-cellular or heterogenous configuration. It makes it possible in these different situations to manage for each pair of access points the interference created by the shared use of certain radio resources.

Note that in accordance with the invention, the first and second terminals can be a mobile phone of smartphone type, a computer, a tablet, or any other communication device configured to be able to be connected to the wireless communication network via an access point to this network.

In an embodiment, the communication method in accordance with the invention further includes a step of determination of the set of transmission parameters as a function of an estimate of a quality of at least one wireless propagation channel (or radio propagation channel) between the first and said at least one second access point, this set of transmission parameters being determined such as to allow said at least one second access point to detect in a signal received thereby, comprising a signal transmitted over the uplink channel by the second terminal, said interference signal created by the first access point during the communication with the first terminal over the downlink channel.

The transmission parameters can particularly be defined on the basis of a predetermined set (also called "codebook") of transmission parameters that can be applied over the communication network. These transmission parameters are for example defined in the specification documents of the standard or standards with which the communication network is compliant. Such a codebook appears for example in the form of a list of pairs each comprising one encoding and one modulation scheme, when the transmission parameters under consideration are encoding and modulation schemes. Of course this example is given solely by way of illustration.

The invention thus makes it possible to choose, given the quality of the propagation channel between the first and second access points, the transmission parameters used on the downlink by the first access point such as to favor the performance obtained on the uplink of the second access point. Specifically, the propagation channel between the first and second access points models the interference generated by the first access point via the downlink communication on the communication of the second access point on the uplink. It is also referred to as the "interference channel" between the first and second access points.

In a variant, it may be envisioned that the transmission parameters of the first access points are determined taking other factors into account, such as for example the quality of service of the downlink of the first access point. Note however that as soon as the second access point manages to eliminate the interference coming from another access point, a gain on the uplink is obtained for the second access point.

In particular for this purpose, the step of estimating the quality of said at least one propagation channel between the two access points can include an estimate of a capacity of said at least one propagation channel.

In a manner known per se, the capacity of a channel denotes the upper limit of the data bitrate (expressed in bits per second for example) which can be transmitted reliably over the channel, i.e. with an error probability tending to zero.

In a variant, the quality of the channel can be estimated from other metrics, such as for example a Signal-to-Interference-plus-Noise Ratio (SINR) obtained over the propagation channel between the two access points, a Channel Quality Indicator (CQI), a power level of the received useful signal, a level of interference over the communication resource under consideration etc. The estimate of the channel quality can also include a test of its availability, an estimate of its response time, an estimate of its gain etc.

In an embodiment of the invention, if a capacity of the downlink channel of the first access point is less than or equal to the capacity of said at least one propagation channel between the first and said at least one second access point, the set of transmission parameters is determined such as to maximize a value of a bitrate transmitted over the downlink channel, within the limit of the capacity of the downlink channel.

In this embodiment, the limiting factor for the choice of transmission parameters applied by the first access point is the capacity of its downlink channel. In accordance with the principles of information theory and more particularly Shannon's theorem, it is not possible to reliably transmit data over a transmission channel with a bitrate higher than its capacity. Consequently, it is not possible to choose transmission parameters to be applied on the downlink via the first access point corresponding to a bitrate higher than the capacity of the downlink channel. On the other hand, it should be noted that the capacity of the downlink channel being less than or equal to the capacity of the channel between the two access points, whatever the determined transmission parameters corresponding to a bitrate lower than or equal to the capacity of this downlink channel, the data transmitted by the first access point by applying these transmission parameters can be appropriately detected by the second access point (and where applicable decoded, then the interference resulting from it eliminated).

By choosing the transmission parameters maximizing the bitrate over the downlink channel (within the limit of the capacity of the downlink channel), the spectral efficiency that can be obtained on the downlink is maximized.

In an embodiment of the invention, if the capacity of the downlink channel of the first access point is greater than the capacity of said at least one propagation channel between the first and said at least one second access point, the set of transmission parameters is determined such as to maximize the bitrate value transmitted over the downlink channel, within the limit of the capacity of said at least one propagation channel between the first and said at least one second access point.

In this embodiment, the first access point uses transmission parameters over its downlink channel corresponding to a limited bitrate by comparison with the bitrate it could envision transmitting given the capacity of this downlink channel, this bitrate being bounded by the capacity of the propagation channel between the two access points such as to enable the detection by the second access point of the interference due to the transmission by the first access point over the downlink channel. To "limit" the loss in terms of bitrate on the downlink of the first access point, in this embodiment, transmission parameters are chosen that make it possible to come as close as possible to the capacity of the propagation channel between the two access points.

It should be noted that in a multicellular situation, in which the first access point is liable to create interference on the signals emitted on the uplinks toward a plurality of access points, one may take into account, when determining the transmission parameters of the first access point, the propagation channel capacities between the first access point and each of said plurality of access points. For example, one may consider a worst-case scenario in which the bitrate corresponding to the chosen transmission parameters is limited by the lowest capacity (downlink capacity of the first access point or smallest of the capacities of the transmission channels separating the first access point and said plurality of access points).

In an embodiment, the communication method in accordance with the invention further includes:

- a step of obtaining of at least one item of information identifying at least one so-called interferer access point of the network generating during a communication over a downlink channel an interference signal affecting a communication of another, so-called interfered, access point over an uplink channel;
- a step of determination on the basis of said at least one item of information obtained, of a set of interfered access point for which said first access point is identified as an interferer access point, said at least one second access point belonging to said determined set.

For example, in one embodiment, the step of obtaining of an item of information identifying an interferer access point includes the reception of this item of information coming from an access point interfered by this interferer access point.

Thus, in this embodiment, the first network device identifies the access points of the network (referred to as "interfered") liable to receive signals on the uplink interfered by the signals sent on the downlink by the first access point, on the basis of information transmitted by these access points. This embodiment makes it possible to establish a map of the interference generated in the network, this map being usable to improve the spectral efficiency of the network.

Within the meaning of the invention, an item of information identifying an access point can be any time of information used to unambiguously identify an access point, such as for example a name or a reference attributed to it by a network operator, an identifier of the access point, in unencrypted form, encrypted or compressed etc.

It should be noted that the first device of the network can target the sending of the data representing the transmission parameters of the first access point toward only a part of the interfered access points, for example those for which the level of interference created by the first access point is above a certain threshold, or found in the neighborhood of the first access point. Alternatively, the first device can send the data representing the transmission parameters toward the access points which are in a position to eliminate the interference generated by the first access point etc.

The identification of the access points interfered by the first access point can be done in different ways. It can for example be a static configuration of the access points by means of a pre-established list of identifiers, which can notably be supplied by the network operator.

In a variant, this list can be determined dynamically by each access point on the basis of pilot signals for example broadcasted by the other access points of the network.

Of course, other solutions can be implemented in the context of the invention.

According to another aspect, the invention also relates to a method of selection, by a second device of a wireless communication network, of a set of transmission parameters, the so-called second set, intended to be used during a communication by a terminal, the so-called second terminal, over an uplink channel set up with an access point to the network, said second access point, this communication being affected by at least one interference signal generated by at least one first access point to the wireless communication network during at least one communication over at least one downlink channel set up with at least one first terminal, this selection method comprising steps of:

- obtaining of at least one item of data representing at least a first set of transmission parameters used by said at least one first access point over said at least one downlink channel; and
- determination as a function of said at least one item of data obtained, of the second set of transmission parameters, this second set of transmission parameters being different from said at least one first set of transmission parameters.

Correspondingly, the invention relates to a second device of a wireless communication network, this second device being configured to select for a network access point, the so-called second access point, a set of transmission parameters, the so-called second set, intended to be used during a communication by a terminal, the so-called second terminal, over an uplink channel set up with the second access point, this communication being affected by at least one interference signal generated by at least one first access point to the wireless communication network during at least one communication over at least one downlink channel set up with at least one first terminal, the second device comprising:

- a communication module configured to obtain at least one item of data representing at least one first set of transmission parameters used by said at least one first access point over said at least one downlink channel; and a determination module configured to determine as a function of said at least one item of data obtained, the second set of transmission parameters, this second set of transmission parameters being different from said at least one first set of transmission parameters.

The features and advantages of the selection method according to the invention presented below are applied in the same way to the second device according to the invention and vice versa.

Furthermore, the features and advantages of the method of communication and of the first device in accordance with the invention already presented are applied in the same way to the selection method and to the second device according to the invention and vice versa.

In particular, in a particular embodiment, said at least one first access point uses during said at least one communication over said at least one downlink channel, a resource used by said second access point during the communication over the uplink channel.

In accordance with the invention, the second device selects the second set of transmission parameters as a function of the data representing the first set of transmission parameters used by the first access point, so that the second access point is capable of eliminating the interference between the signals received from the first access point (and emitted thereby over a downlink channel) and the signals received from the second terminal via the uplink channel. To allow this elimination, and more particularly the detection of the interference created by the first access point, the transmission parameters used by the second access point must differ from those used by the first access point. Similar considerations are taken into account when the second access point encounters interference coming from several access points.

By way of example, when the access points use a Non-Orthogonal Multiple Access (NOMA) technique implementing encoding by superposition and multiplexing in the power domain, the second device typically selects a different power from that applied by the first access point, this selection leading to a superposition of the signal emitted over the uplink channel by the second terminal on the signal emitted over the downlink channel by the first access point. Thus, the second access point can distinguish the data received from the second terminal from the data received from the first access point.

In accordance with the invention, the first and the second set of transmission parameters are different: in other words, there exists at least one parameter of one of these sets (of the first set for example) which is different from each of the parameters of the other set (of the second set in this example).

The selection of all or part of the second transmission parameters can be done, in a particular embodiment, on the basis of a predefined list of transmission parameters (for example a list comprising a plurality of pairs each identifying an encoding scheme and a modulation). This list can be contained in a memory of the second device in accordance with the invention or a storage unit accessible by the second device, such as a database.

In a particular embodiment, the second set of transmission parameters is determined such as to maximize a bitrate transmitted over the uplink channel within the limit of a capacity of this uplink channel.

In this way, the spectral efficiency that can be obtained over an uplink is maximized.

As explained previously, the second device of the network is a radio access network device.

In an embodiment, the second device of the network is the second access point or is contained (e.g. embedded) in the second access point.

In this embodiment, the step of obtaining of at least one item of data representing the first set of transmission parameters can include a reception of this data item coming from the first device in accordance with the invention.

In another centralized embodiment, the second device is included in a network managing entity able to communicate with the first access point and the second access point, for example a central management entity of the network. In this centralized embodiment, the first and second devices are preferably both hosted in the network management entity. In particular, it is possible to have within this entity one single device implementing the functions of the first and second devices according to the invention.

In an embodiment, the selection method further includes a step of sending to the second terminal a command to use the second set of transmission parameters.

In an embodiment, the sending step is implemented if the second set of transmission parameters comprises at least one transmission parameter different from a transmission parameter already used by the second terminal on the uplink channel.

This mode makes it possible to avoid the pointless sending of information to the second terminal when its transmission parameters remain unchanged. This advantageously makes it possible to limit the signaling exchanged over the network.

In particular, the sending of the command to the second terminal can be done by or via the second access point which then serves as a relay between the second device and the second terminal. In a particular embodiment, the selection method further comprises:

a step of determination of at least one access point to the so-called interferer network for the second access point, generating over a downlink channel set up with a terminal an interference signal affecting a communication of the second access point over the uplink channel; and a step of supplying to a first device of the network at least one item of information identifying the determined interferer access point(s), this information being intended to be used by the first device of the network to determine a set of transmission parameters of the determined interferer access point(s).

As mentioned previously, this embodiment allows the first device of the network to establish a map of the interference generated in the network.

In an embodiment, a network managing entity implements the communication method in accordance with the invention, as well as the selection method in accordance with the invention: this entity communicates the first set of parameters to the second access point, and selects the second set of parameters intended to be used by the second terminal connected to the second access point. This entity can be centralized. It can moreover determine the first set used by the first access point.

As mentioned previously, the invention is advantageously applicable when the communication network implements a Full-Duplex (FD) communication method at the level of all or part of its access points. We recall that in FD mode, an access point emits and receives data over one and the same radio communication resource (for example it uses the same time-frequency resource, in other words, it emits and receives data in the same time interval over the time over the same frequency). Preferably, the invention is applicable when the second access point is operating in FD mode and is configured to always be able to receive data. The first access point can operate in FD mode or in Half Duplex (HD) mode.

But the invention can also be applied in other situations.

Thus, the invention has an advantageous application when the second access point is operating in HD mode and when the uplink channel of the second access point coincides in time or in frequency with an emission of data by the first access point over at least one of its downlink channels.

The invention can also be applied when the first and the second access point are both operating in HD mode, particularly when these are not synchronized. It should however be noted that in such a situation, the access points operating in HD mode which are liable to interfere with one another can also become synchronized with one another.

When the first and the second access point are both operating in FD mode, each of these access points can implement the two methods of the invention, for a mutual exchange of transmission parameters between the two access points and a reduction of the interference at the level of the uplink channels of the two access points. In a variant, as previously described, this exchange can be done via a centralized management entity configured to communicate with the two access points.

The invention is also applied in other interference generation situations (use of adjacent, neighboring resources, or resources which are remote but using emissive powers in such a way that interference is generated).

The invention also relates to a system in a wireless communications network, including at least a first device in accordance with the invention, at least one second device in accordance with the invention, at least one first access point to the network and at least one second access point to the network.

In an embodiment, the first device in accordance with the invention is included in the first access point and/or the second device in accordance with the invention is included in the second access point.

In an embodiment, the first device and the second device in accordance with the invention are contained in a network managing entity, for example centralized, able to communicate with the first access point and the second access point.

The invention also relates to a first computer program on a recording medium, this program being able to be implemented in a computer or in a first network device in accordance with the invention. This program includes instructions suitable for implementing a communication method as described above.

The invention also relates to a second computer program on a recording medium, this program being able to be implemented in a computer or a second network device in accordance with the invention. This program includes instructions suitable for implementing a selection method as described above.

Each of these programs can use any programming language, and be in the form of source code, object code or intermediate code between source code and object code, such as in a partially compiled form, or in any other desirable form.

The invention also relates to an information medium or a recording medium readable by a computer and including instructions of the first or second computer program as mentioned above.

The information or recording media can be any entity or device capable of storing the programs. For example, the media can include a storage means, such as a ROM, for example a CD-ROM or a microelectronic circuit ROM, or else a magnetic recording means, for example a diskette (floppy disk) or a hard disk, or a flash memory.

Moreover, the information or recording media can be transmissible media such as an electrical or optical signal, which can be conveyed via an electrical or optical cable, by radio link, by optical link or by other means.

The programs according to the invention can in particular be downloaded over a network of Internet type.

Alternatively, each information or recording medium can be an integrated circuit into which a program is incorporated, the circuit being suitable for executing or being used in the execution of the communication method, in accordance with the invention, or the selection method, in accordance with the invention.

BRIEF DESCRIPTION OF THE DRAWINGS

Other features and advantages of this invention will become apparent from the description given below, with reference to the appended drawings which illustrate an exemplary embodiment thereof devoid of any limitation. In the figures:

FIG. 1 illustrates an architecture of a wireless communication network in which the methods of the invention are implemented according to an embodiment of the invention;

FIG. 2 is a block diagram showing steps of a communication method and steps of a selection method according to the invention, in a first embodiment of the invention;

FIG. 3 is a block diagram showing sub-steps of a step of obtaining of transmission parameters implemented in the communication method illustrated in FIG. 2;

FIG. 4 is a block diagram showing steps of a communication method and steps of a selection method according to the invention, in a second embodiment of the invention;

FIG. 5 is a block diagram showing steps of a communication method and steps of a selection method according to the invention, in a third embodiment of the invention;

FIG. 6 shows functional architectures of a system, a first and a second network device in accordance with the invention; and FIG. 7 shows hardware architectures of a first and a second network device in accordance with the invention.

DESCRIPTION OF THE EMBODIMENTS

FIG. 1 illustrates an architecture of a wireless communication network NET in which the methods of the invention are implemented according to a particular embodiment of the invention.

In this embodiment, the network NET is a $4^{th}$-generation cellular network. This network NET includes a system SYS comprising two access points b' and b.

In this embodiment, the access points b' and b are 4G base stations of eNodeB type.

Of course, these assumptions are not limiting per se, and as previously described, the invention applies to other communication networks (for example 3G, 5G, WiFi, LiFi, etc.), to other types of access points (WiFi, LiFi access points, base stations etc.), and to other network configurations (for example, comprising a different number of access points, or several sub-networks managed by the same operator or different operators) etc.

In particular, the network NET can be a network of WiFi type. In such a case, the access points b' and b are compliant with the WiFi standard. These access points b' and b can in particular be network termination equipment items, known as “boxes” such as a LiveBox equipment from Orange (trademark).

Alternatively, the network NET can be a network of LiFi type. In this case, the access points b' and b are access points to this LiFi network and can be emitters/receivers of light waves.

In another situation, the access points b and b' can implement different access technologies.

In the embodiment described here, both access points b and b' are operating in FD mode. It is further supposed that terminals u' and d' are connected to the first access point b' and that the terminals u and d are connected to the second access point b. No limitation is attached to the nature of these terminals (smartphones, digital tablets, computers etc.)

In the remainder of the description, by way of illustration, we are specifically interested in the uplink channels UL' and UL connecting the terminals u' and u to the access points b' and b respectively and allowing the terminals u' and u to send signals conveying data to the access points b' and b respectively, as well as to the downlink channels DL' and DL connecting the terminals d' and d to the access points b' and b respectively allowing the access points b' and b to send signals conveying data to the terminals d' and d respectively.

In the embodiment described here, it is supposed that there is a direct communication link FIB between the two access points b' and b, realized for example by means of an optical fiber. This direct communication link is used by the access points to exchange various types of information (for example synchronization information, transmission parameters, etc.) as detailed below.

In a variant, the two access points b and b' can communicate with one another via a wired or wireless communications link relying on either the same technology as the network NET or on another technology.

In another embodiment, the network NET can be a centralized network, for example of C-RAN type, and comprise a central entity D for managing or controlling the network NET. In this embodiment, the link FIB can then be a communication link allowing an indirect communication between the two access points b' and b via this central entity D for managing or controlling the network NET.

In the embodiment described here, the terminals u', d', u and d are operating in HD mode. Of course, these assumptions relating to the operation of the access points b' and b and of the terminals u', d', u and d in FD mode or in HD mode are not limiting. The invention is also applicable in cases where at least one of the terminals is operating in FD mode or in cases where at least one of the access points is operating in HD mode. By way of example, the second access point b can be operating in FD mode and the first access point b' in HD mode.

Furthermore, in the embodiment described here, the access points b' and b use power multiplexing, based on a NOMA technique known to those skilled in the art. Such a technique can be used in combination for example with a waveform of CDMA (Code Division Multiple Access) or OFDM (Orthogonal Frequency-Division Multiplexing) type. Of course this assumption is not limiting in itself, and the invention is also applicable in other situations (including without using any NOMA technique) in which an interference cancellation technique, for example of SIC (Successive Interference Cancellation) type can be used, such as particularly a code multiplexing technique etc.

It is supposed that the first and second access points can share a same wireless communication radio resource (or RB), such as a same frequency during a same time interval. This resource is for example here used by the first access point b' over its downlink channel to communicate with the terminal d'. This same resource is also used by the terminal u over the uplink channel to communicate with the second access point b. This shared use of the same RB has the consequence that the down communications using this resource RB between the first access point b' and the terminal d' generate interference signals over the up communications using the resource RB between the second access point b and the terminal u. The invention proposes an effective solution to be able to suppress this interference.

Note that the invention is also applicable in other situations, as long as the first access point b' generates, during its downlink communications, interference signals liable to affect uplink communications from other access points of the network such as the second access point b. This can be the case particularly when the first access point b' uses simultaneously over a downlink channel an adjacent or neighboring resource (for example an adjacent or neighboring frequency) of a resource used by the second access point b over an uplink channel. This scenario can also be encountered when the first access point b' uses a frequency more remote than the second access point b but due to imperfections which in practice affect current communication systems (for example defective filters, intermodulation products due to saturation in power amplifiers, etc.), the first access point generates interference liable to affect the signals received by the second access point b.

FIG. 2 is a block diagram showing steps of a method of communication to the second access point b data representing a set of transmission parameters used by the first access point b', in accordance with the invention, and steps of a method of selection of a second set of transmission parameters in accordance with the invention in a particular embodiment.

In the embodiment shown in FIG. 2, the first device implementing the communication method according to the invention is contained in the first access point b'. Hence, the first access point b' implements the communication method according to the invention. Moreover, the second device implementing the selection method according to the invention is contained in the second access point b. The second access point b therefore implements the selection method in accordance with the invention.

The steps E102 and E104 described below are steps of the communication method according to the invention. The steps E200, E202, E204 and E206 described below are steps of the selection method according to the invention.

During a step E102, the first access point b' obtains the set of transmission parameters MCS_b' (first set of transmission parameters within the meaning of the invention) that it uses over its downlink channel to communicate with the terminal d'. In the embodiment described here, these transmission parameters define a modulation and encoding scheme. They more particularly comprise an identifier unambiguously defining a modulation and an encoding scheme used by the first access point b', as well as an emissive power level applied by the first access point b' when it sends signals over its downlink channel towards the terminal d' in accordance with the NOMA technique. An exemplary embodiment of step E102 of obtaining of the set of transmission parameters MCS_b' will later be described with reference to FIG. 3.

As described previously, this example of a set MCS_b' of transmission parameters is given solely by way of illustration. The invention is applicable to other transmission parameters used to define the transmission scheme applied by the access point b' when it communicates over its downlink channel with the terminal d' to generate the signals conveying the data sent to the terminal d'. Thus for example, the transmission parameters can define a power level, an encoding scheme used for multiple access etc.

During a step E104, the first access point b' sends to the second access point b data DATA representing the set of parameters MCS_b'. In the mode described here, the data DATA can take a different form as long as they unambiguously represent the transmission parameters MCS_b'. Thus, by way of example, the data DATA may result from a compression, an encryption and/or an encoding of the set of parameters MCS_b'. The sending of this data DATA is done here via the link FIB between the two access points b' and b.

During a step E200, the second access point b receives this data DATA representing the set MCS_b'.

During a step E202, the access point b selects as a function of the received data (E200) DATA and here on the basis of a pre-established list of L of transmission parameters (e.g. a list of pairs each comprising an encoding scheme and a modulation), a second set MCS_u of transmission parameters different from the first set MCS_b' of transmission parameters. In other words, the second set MCS_u comprises at least one transmission parameter different from the parameters of the first set MCS_b'. The selected parameters of the second set MCS_u are intended to be applied by the terminal u over the uplink channel UL toward the second access point b. In this embodiment, the parameters MCS_u also include a scheme of modulation and encoding and a power level. However, as previously described, this assumption is non-limiting.

Moreover, in the embodiment described here, the second set MCS_u of transmission parameters is selected by the access point b such as to maximize the transmission bitrate obtained over the uplink channel UL between the terminal u and the access point b. For this purpose, the access point b chooses from a list L an encoding scheme, a modulation and a power level making it possible to reach a bitrate as close as possible to the capacity of the uplink channel UL between the terminal u and the access point b.

In this way, the second access point b selects parameters MCS_u allowing it firstly, to eliminate or reduce the interference coming from the signals emitted by the first access point b' over its downlink channel DL' using the parameters MCS_b' and the same radio resource as the terminal u uses on the uplink to communicate with the second access point b, and moreover, to maximize the spectral efficiency over its uplink.

In the mode described here, the list L is included in a memory of the second access point b. Alternatively, this list L can be contained in a database or in a memory external to the second access point b and accessible thereby.

During a step E204, the second access point b sends the terminal u a command to use the set of parameters MCS_u. We suppose that the terminal u applies this command.

During a step E206, when the second access point b receives over the same radio resource (i.e. here over the same frequency and during the same time interval) data from the terminal u via the uplink channel UL, and an interference signal INT generated by the first access point b' using the same radio resource to communicate with the terminal d' over the downlink channel DL', the second access point b applies a method of elimination of the interference signal INT coming from the first access point b'. For this purpose, the second access point b knows the set MCS_b' of the parameters used by the first access point b', the data DATA representing this set having been transmitted to it in step E200. In addition, the second access point b knows the set MCS_u of parameters used by the terminal u, this second access point b having itself selected these parameters MCS_u for the terminal u in step E202. On the basis of the set of transmission parameters MCS_b', the second access point b is able to estimate the interference INT generated by the first access point b' and deduct it from the total signal it has received. It can also detect the useful signal coming from the terminal u and decode it on the basis of its knowledge of the transmission parameters MCS_u. These different steps can be implemented for example using an interference cancellation technique, for example of SIC type. The interference signal INT comes from the signal emitted by the first access point b' over the downlink channel DL' using the resource RB and applying the transmission parameters MCS_b', propagated from the first access point b' toward the second access point b via a wireless (or radio) propagation channel PR_INT between these access points b and b'.

FIG. 3 is a block diagram showing different sub-steps implemented during step E102, shown in FIG. 2, to obtain the first set MCS_b' of the transmission parameters used by the first access point b' over its downlink channel DL' to communicate with the terminal d'. In the embodiment described here, the step E102 is implemented by the first access point b'. In this embodiment, the first access point b' determines the transmission parameters MCS_b' taking into account the quality of the wireless (or radio) propagation channel PR_INT between the access points b and b' and the quality of the downlink channel DL' between the first access point b' and the terminal d'.

It should be noted that the propagation channel PR_INT between the access points b and b' corresponds to a so-called "interference channel" modeling the interference generated by the downlink communications of the first access point b' on the uplink communications of the second access point b (here, when shared resources are used by the first and second access point). This propagation channel PR_INT is not necessarily the same as the transmission channel FIB used by the access points b and b' to exchange this information, and particularly the transmission parameters used by the first access point b. Thus, in the example envisioned here in which a FIB link relying on an optical fiber is used as a transmission channel between the two access points b and b' to exchange this information, the propagation channel PR_INT has different characteristics from the FIB transmission channel. This is also the case if for example the access points b and b' exchange information via dedicated antenna, separate from the antenna that they use to communicate with the terminals over the NET network.

In the embodiment described here, the first access point b' estimates the quality of the radio propagation channel PR_INT between the access points b and b' on the basis of the capacity Cb'_b of this propagation channel, and the quality of the downlink channel DL' between the first access point b' and the terminal d' on the basis of the capacity Cd' of the downlink channel DL' between the first access point b' and the terminal d'.

For this purpose, in this embodiment, the step E102 includes a sub-step E110 of estimating the propagation channel PR_INT between the access points b and b'. In this example, the estimate of the propagation channel is used to estimate the quality of the propagation channel PR_INT between the access points b and b' by evaluating the capacity Cb'_b of this channel. The way in which the capacity Cb'_b is estimated is detailed further on in the text.

The step E102 also includes a sub-step E120 of estimating a capacity Cd' of the downlink channel DL' going from the access point b' toward the terminal d'. This capacity can be estimated during the connection of the terminal d' to the access point b', for example on the basis of information escalated from the terminal d' such as a Channel Quality Indicator (CQI) or a measurement taken by the terminal d' of the Signal-to-Interference-plus-Noise Ratio over this downlink channel DL'. The way in which the capacity Cd' is estimated is detailed further on in the text.

The order of the sub-steps E110 and E120 is not important.

Then, the first access point b' compares, during a sub-step E130, the capacities Cb'_b and Cd'.

In the embodiment described here, if the capacity Cd' of the downlink channel is less than or equal to the capacity Cb'_b of the propagation channel PR_INT between the two access points, the first access point b' determines over a sub-step E140 the set of transmission parameters MCS_b' (for example on the basis of the list L) such as to maximize the bitrate over the downlink channel, within the limit of the capacity Cd'. In other words, in the best-case scenario, the value of the bitrate corresponding to the transmission parameters selected MCS_b' is equal to the capacity Cd'.

If the capacity Cd' of the downlink channel is strictly greater than the capacity Cb'_b of the propagation channel PR_INT between the two access points, the first access point b' determines over a sub-step E150 the transmission parameters MCS_b' (i.e. here selects the transmission parameters MCS_b' from the list L) such that the value of the bitrate transmitted over the downlink channel DL' is equal to (or at least comes as close as possible to) the capacity Cb'_b of the propagation channel PR_INT between the two access points.

In the following, we recall the definition and expression of the capacity of a communication channel, and we introduce the expressions of the capacities Cb'_b and Cd' estimated (E110 and E120) and compared (E130) by the first access point b'.

In a manner known per se, the capacity of a communication channel denotes the upper limit of the bitrate that can be transmitted over this channel in order to allow reliable data transmission. The capacity of a channel can be defined according to Shannon's theorem as the product of the channel bandwidth and the logarithm (binary in the special case of the transmission of binary data over this channel) of 1 plus the signal-to-interference-plus-noise ratio SINR. The SINR is given by the ratio of the power of the useful signal received, transmitted over the channel (without noise or interference), over the noise power and interference signals received over this same channel. The expression of the SINR over the uplink channel UL from the terminal u toward the second access point b is given subsequently with reference to equation 1.

Note that the bitrate transmitted over a wireless communication channel depends on the transmission scheme used to transmit the data over this channel, i.e. where applicable the encoding scheme of the channel under consideration, the modulation used, processing delays etc. Contrariwise, the capacity of the channel represents the upper limit of this bitrate and does not depend on the transmission scheme. The bitrate transmitted over the channel and the capacity of the channel are expressed in bits per second.

In a variant, by normalizing the expression of the capacity given above with respect to the bandwidth, an expression is obtained of the capacity of the channel in bits/second/Hz, equal to the logarithm (binary) of 1 plus the signal-to-interference-plus noise ratio SINR.

Thus, the capacity Cu of the uplink channel UL from the terminal u to the second access point b, when the methods of the invention are not implemented, can be defined, in bits/second/Hz, by:

$$Cu = \log_2(1 + SINR) = \log_2\left(1 + \frac{S_b(u)}{S_b(b') + n + RSI + S_b(u')}\right) \quad \text{[Math. 1]}$$

where $S_b(u)$ is the power of the signal received by the second access point b coming from the terminal u, $S_b(b')$ is the power of the interference signal received by the second access point b coming from the first access point b', n is the power of the ambient noise, RSI (Residual Self-interference) is the power of the self-interference signals caused by the emission of signals by the second access point b (over the downlink channel toward the terminal d for example) and $S_b(u')$ is the power of the signals received by the second access point b coming from other terminals (the terminal u' for example) sharing the same radio resource as the terminal u.

In general, the power $S_i(j)$ of the signal emitted by an entity i via a transmission (or communication) channel and received by an entity j can be defined by the product of the gain $h_{i,j}$ of the transmission channel between the entity i and the entity j, of a gain G of antennas between these entities i and j, and of the emissive power Pj applied by the entity j. Thus by way of example the power $S_b(u)$ may be defined by:

$$S_b(u) = h_{u,b} G_{u,b} P_u \quad \text{[Math. 2]}$$

In a similar way, the capacity Cd' of the downlink DL' from the first access point b' toward the terminal d' can be defined by:

$$Cd' = \log_2\left(1 + \frac{S_{d'}(b')}{S_{d'}(b) + S_{d'}(u') + S_{d'}(u) + n}\right) \quad \text{[Math. 3]}$$

The first access point b' here determines (E102) the set MCS_b' of the transmission parameters it uses as a function of this capacity Cd', such as to maximize the bitrate on the downlink DL' within the limit of the capacity Cd' of this downlink DL'.

The capacity Cb'_b of the radio link of the first access point b' toward the second access point b can be defined by:

$$Cb'\_b = \log_2\left(1 + \frac{S_b(b')}{S_b(u) + n + RSI + S_b(u')}\right) \quad \text{[Math. 4]}$$

By implementing the methods of the invention, when the capacity Cd' is less than or equal to the capacity Cb'_b, or when the capacity Cd' is greater than the capacity Cb'_b and when the first access point b' limits (E150) the bitrate over the downlink channel, the second access point b is capable of suppressing the interference generated by the first access point b (having a power level $S_b(b')$) (using its knowledge of the first set MCS_b' of transmission parameters. The capacity Cu of the uplink is then defined by:

$$Cu = \log_2\left(1 + \frac{S_b(u)}{n + RSI + S_b(u')}\right) \quad \text{[Math. 5]}$$

The different capacity formulae correspond to the case where the interference signal generated by the first access point b' is linked to the use of the same radio resource over its downlink channel DL' as the second access point b over its uplink channel UL. As mentioned previously, the invention is also applicable in other situations (for example, HD mode, use of adjacent resources, etc.); those skilled in the art could without difficulty adapt the equations above to these other situations. Thus, for example in HD mode, the capacity formulae can be written in the form (assuming that only the elements of the network that have a high power are interference sources and using the notation introduced previously):

$$Cu = \log_2\left(1 + \frac{S_b(u)}{S_b(b') + n}\right) \quad \text{[Math. 6]}$$

(if the invention is not implemented)

$$Cd' = \log_2\left(1 + \frac{S_{d'}(b')}{S_{d'}(b) + n}\right) \quad \text{[Math. 7]}$$

$$Cb'\_b = \log_2\left(1 + \frac{S_b(b')}{S_b(u) + n}\right) \quad \text{[Math. 8]}$$

$$Cu = \log_2\left(1 + \frac{S_b(u)}{n}\right) \quad \text{[Math. 9]}$$

(when the invention is implemented)

In the first embodiment that has just been described, we have considered a system SYS comprising two access points b and b', the access point b implementing the selection method according to the invention and the access point b' implementing the communication method according to the invention. Note that when the access points are configured in FD mode, they can use the same radio resources on the uplink and on the downlink, and therefore the assumption envisioned above in which the access point b' is an interferer for the access point b can also be valid in the other direction (i.e. the access point b is an interferer for the access point b'). One can therefore envision, in a particular embodiment, that each of the access points b and b' are configured to implement both a communication method according to the invention and then a selection method according to the invention.

FIG. 4 is a block diagram representing the steps of a communication method and the steps of a selection method according to the invention, in a second particular embodiment in which they are implemented by a central control entity D of the network NET. In other words, in this second embodiment, the first device according to the invention which is able to implement the communication method and the second device according to the invention which is able to implement the selection method according to the invention are contained in the central control entity D of the network NET.

The step E101 described hereinafter is a step of the communication method according to the invention. The steps E100, E202, E204 described hereinafter are steps of the selection method according to the invention.

During a step E100, the central entity D determines the first set MCS_b' of transmission parameters intended to be used by the first access point b'. In particular, the determination E100 of this set MCS_b' can take into account the capacity Cd' of the downlink DL' between the first access point b' and the terminal d' such as to maximize the bitrate over this link DL' within the limit of the capacity Cd' of this link. For this purpose it can rely on channel quality information of the downlink channel DL' escalated by the terminal d' and/or the access point b'.

During a step E101, the central entity D sends a command to the first access point b' so that it uses the set of parameters MCS_b' over its downlink channel DL'.

During the same step E101, the central entity D sends to the second access point b data DATA representing the first set MCS_b' of transmission parameters. In the mode described here, the central entity D sends the data DATA to the second access point b at the same time as it sends the command to the first access point b'. However, these two sends can be envisioned as being carried out in two different steps, regardless of the order of these steps.

The first access point b' receives the command during a step E102 and uses the first set MCS_b' of transmission parameters over its downlink channel DL'.

The second access point b receives the data DATA during a step E200, similar to the step E200 described with reference to FIG. 2.

During a step E202, the central unit D selects the second set MCS_u of transmission parameters, this set being intended to be used by the terminal u over the uplink channel UL set up with the second access point b. The selection E202 here takes into account the capacity Cu of the uplink UL. The capacity Cu can for example be estimated by the second access point b and sent by this latter to the central entity D.

During a step E204, the central entity D sends to the terminal u, via the second access point b, a command to use the second set of transmission parameters MCS_u.

During a step E204*b*, the second access point b receives and transfers this order to the terminal u.

During a step E206, similar to the step E206 described with reference to FIG. 2, the second access point b can, using its knowledge of the first set MCS_b' (E200) and the second set MCS_u (E204*b*), eliminate the interference INT generated by the first access point b'.

As previously described, in the first and second embodiment, we have considered a system SYS comprising only two access points b and b'. This assumption is not limiting per se, and a greater number of access points can be envisioned within the system SYS. In such an embodiment, each access point can undergo interference from several access points.

FIG. 5 is a block diagram representing the steps of a method in accordance with the invention for communicating data representing a set of transmission parameters used by the first access point b' and steps of a method for selection a second set of transmission parameters in accordance with the invention, in a third particular embodiment.

In this third embodiment, unlike the modes described with reference to FIGS. 1 to 4, the system SYS includes more than two access points, namely, the first access point b', the second access point b and at least one third access point b", b'", etc.

As in the first embodiment described with reference to FIGS. 1 to 3, it is supposed here that the first device in accordance with the invention is contained in the first access point b' and the second device in accordance with the invention is contained in the second access point b. Hence, the first access point b' implements the communication method in accordance with the invention and the second access point b implements the selection method in accordance with the invention. Note however that this assumption is not limiting and another embodiment could be envisioned, similar to the second embodiment wherein the first and the second device according to the invention are contained in a central management entity D of the network NET.

In FIG. 5, the steps E400, E401, E402 and E404 of the communication method according to the invention are implemented by the first access point b', while the steps E380, E390, E500, E502, E504 and E506 of the selection method according to the invention are implemented by the other access points of the system SYS, and in particular by the second access point b. For the sake of simplicity we will subsequently describe only the steps of the selection method as they are implemented by the second access point b. These steps are implemented in a similar or identical way by the other access points of the system SYS interfered by the first access point b'. Furthermore, as mentioned previously, it is also possible to envision that each of the access points of the system SYS is capable of implementing both the communication method and then a selection method in accordance with the invention according to whether it is the interferer with regard to another access point of the system or interfered by another access point of the system.

During a step E380, the second access point b (and similarly, all the other access points of the system SYS implementing a selection procedure in accordance with the invention) determines a set denoted IM(b) identifying all the access points playing the role of interferers with regard to the access point b. We recall that the term "interferer access points with regard to the access point b" is understood to mean within the meaning of the invention the access points of the system SYS which use over their downlink channels resources which are liable to create interference signals on the communications implemented by the access point b over its uplink channel UL set up with the terminal u. In the illustrative example envisioned here, these interference signals result from the use of one and the same radio resource RB by the interferer access points on the downlink and by the access point b on the uplink.

For the sake of simplicity, in the rest of the description the set IM(b) will not be indexed with respect to the resource RB, and only the radio resource RB is considered; however, it goes without saying that the access point b can determine such an assembly for each of the radio resources RB that it uses and which it shares with other access points of the system SYS.

In the embodiment described here, the set IM(b) comprises (i.e. identifies) at the most M interferer access points, M denoting an integer number corresponding to the maximum number of interference signals that the access point b is capable of eliminating using the interference elimination technique it is implementing.

In a variant, the set of the interferers determined by the access point b contains all the potential interferers with respect to the access point b independently of its capacity to eliminate the interference signals generated by these interferers (i.e. it is then a set I(b)).

It is supposed in this example that the second access point b has determined during this step E380 that the first access point b' is part of the set of its interferers IM(b).

The set IM(b) can be determined (E380) for example on the basis of the signal powers received by the second access point b from the different access points of the network NET. Such signals are for example the synchronization signals emitted by the access points of the system SYS and received by the second access point. The set IM(b) determined can thus comprise all the access points from which the second access point b is capable of receiving a synchronization signal, or in a variant, the access points of which the received signals have a signal level higher than a predetermined threshold, or else if there are more than M access points meeting the chosen criterion, the M access points corresponding to the M strongest interferers with respect to the access point b.

In a variant, the set IM(b) can be determined (E380) on the basis of the distances separating the access point b from the other access points, the set IM(b) comprising for example all the access points with a distance to the access point b not exceeding a predetermined threshold or if there are more than M access points meeting this criterion, the M access points closest to the access point b. In particular, when the network NET is of C-RAN type, these distances can be sent by a central equipment item for controlling the network NET (such as the central management entity D considered previously) to the access point b (and where applicable to all the network access points). Alternatively, the distances separating the access point b from the other access points of the network NET can be recorded by an administrator or by an operator of the network NET, in a memory accessible by the second access point b.

Note that no limitation is attached to the way in which the interferer access points of the access point b are identified in the set IM(b). These can be hardware identifiers of the access points, or identifiers of cells covered by the access points, etc. as long as these identifiers are used to unambiguously designate the concerned access points.

During a step E390, the second access point b sends an item of information INFO representing the set IM(b) to all the access points identified in the set IM(b) to inform them of the fact that they constitute interferer access points of this second access point b (for the radio resource RB here). To do this, it uses for example the direct link FIB which it possesses to communicate with each of the access points. The information INFO may correspond to the set IM(b) of the identifiers of the interferer access points of the access point b strictly speaking, or be the result of a compression, an encryption of this set IM(b), or else take the form of a memory address from which this set IM(b) may be obtained, etc.

Alternatively, during step E390, the second access point b can send the item of information INFO to only a part of the access points identified in the set IM(b). This part can be selected as a function of a pre-established criterion such as an emissive power by the selected access points greater than a threshold or a distance separating these access points from the second access point b above a threshold.

Alternatively, the second access point can communicate the item of information INFO to a third-party device of the network NET (for example to the central management or control entity D of the network NET previously described), and it is this third-party device which transmits the item of information INFO to the first access point b'.

During a step E400, it is supposed that the first access point b', forming part of the set IM(b), receives the item of information INFO from the second access point b. If the access point b is an interferer within the meaning of the invention for other access points of the system SYS implementing the selection method in accordance with the invention, it can also receive items of information INFO from each of these other access points.

During a step E401, the first access point b' aggregates the items of information INFO it has received, and determines from the aggregated information the set denoted J(b') of the so-called "interfered" access points of the system SYS for which the first access point b' is identified as an interferer access point within the meaning of the invention.

In the example described here, the set J(b') includes all the access points interfered by the first access point b'. Alternatively, the set J(b') can include a limited number N of access points. For example, the set J(b') can comprise the N access points the most interfered by the first access point b', these access points being able to be determined as a function of the respective capacity of their wireless communication link with the first access point b'.

In the example envisioned here, it is supposed that the set J(b') includes several access points including the access point b.

During a step E402, the first access point b' obtains a set MCS_b' of transmission parameters over its downlink channel DL'. This set MCS_b' is here determined as a function of the capacity Cd' of the downlink of the first access point b' using the resource RB and the capacities of each of the wireless propagation channels separating the first point b' from the access points of the set J(b') (and therefore particularly here the capacity Cb'_b of the radio propagation channel between the first access point b' and the second access point b).

In a variant, the set MCS_b' can be determined as a function of the capacity Cd' of the downlink DL' and the capacities of each of the transmission channels between the first point b' and only a part of the access points of the set J(b'), this part being selected on the basis of a predetermined criterion.

More precisely, according to an exemplary embodiment, the first access point b' can obtain (E402) the first set MCS_b' as a function of the capacity Cd' of the downlink DL' and the smallest of the capacities of the propagation channels between the first point b' and each of the access points of the set J(b'), denoted Cmin.

In particular, and in a similar way to that described previously with reference to step E130 illustrated in FIG. 3, if the capacity Cd' of the downlink channel DL' is less than or equal to the smallest capacity Cmin of the propagation channels, the first access point b' can determine a set of transmission parameters MCS_b' making it possible to maximize the bitrate over the downlink channel DL' within the limit of the capacity Cd'.

If on the contrary, the capacity Cd' of the downlink channel is greater than the capacity Cmin, the first access point b' can determine transmission parameters MCS_b' such that the value of the bitrate transmitted over the downlink channel DL' is equal to (or at least comes as close as possible to) the capacity Cmin. In this way, it is ensured that all the access points interfered by the first access point b' will be capable of eliminating the interference generated by the first access point b' during its communications with the transmission parameters MCS_b' over its downlink channel DL'.

According to another exemplary embodiment, the first access point b' can obtain (E402) the first set MCS_b' as a function of the capacity Cd' of the downlink DL' and the capacities of the propagation channels between the first point b' and the access points of the set J(b') which are above a given threshold. The threshold can in particular depend on the quality of service desired on the downlink DL'. In this exemplary embodiment, the chosen set of transmission parameters MCS_b' will not be able to allow all the interfered access points to eliminate the interference coming from the first access point b' (particularly those for which the capacity of the propagation channels with the first access point b' is too low), but it makes it possible to ensure a target quality of service on the downlink DL'.

The chosen policy for determining the first set MCS_b' as a function of the capacity of the channel Cd' and the capacities of the propagation channels between the first access point b' and the access points interfered by the first access point b' is the result of a trade-off and can be defined or parameterized by the operator of the network NET as a function of various criteria (quality of service on the downlink and/or uplink, spectral efficiency etc.)

During a step E404 similar to step E104 described with reference to FIG. 2, the first access point b' sends to all or part of the set J (b') the data DATA representing the set of parameters MCS_b' it has thus determined. The first access point b' is configured to send the data DATA to all the access points identified in the set J(b') or to only a part of this set, selected as a function of a given criterion. Thus, for example, the data DATA can be sent solely to the interfered access points implementing an interference elimination method (such as a SIC method) or to a determined number of the most interfered access points, determined as a function of the respective capacity of their wireless communication link with the first access point b'. In the mode described here, we are supposing that the first access point sends this data DATA in particular to the second access point b.

The second access point b receives this data DATA during a step E500 similar to the step E200 described with reference to FIG. 2.

In the embodiment described here, when the second access point b receives (E500) the data DATA from another access point of the network NET, it checks if this other access point is part of the set IM(b). If this is not the case, the second access point b does not know the data DATA corresponding to this other access point (particularly to determine the set of transmission parameters MCS_u, as detailed below).

This step E500 is followed by a step E502 of selection by the second access point b of a set MCS_u of transmission parameters intended to be used by the terminal u over the uplink channel connecting it to the access point b, a step E504 of sending a command to the terminal u to apply this set of parameters MCS_u, and a step E506 of applying an interference cancellation technique to eliminate the interference caused by the first access point b' on the uplink channel between the terminal u and the second access point b, the steps E502, E504 and E406 being similar to steps E202, E204 and E206 described with reference to FIG. 2.

Note that in the step E500, the second access point b can receive data DATA of several interferer access points (including the first point b'), this data representing the transmission parameters used by these different interferer access points. In the case, the second access point b selects (E502) the set of parameters MCS_u as a function of all or at least a part of the data DATA received from different access points.

More precisely, the second access point b selects a set of transmission parameters MCS_u different from each of the sets of transmission parameters represented by the data DATA that it received from different interferer access points. The term "different set of transmission parameters" is understood to mean a set comprising at least one different transmission parameter.

In a variant, the second access point b selects a set of transmission parameters MCS_u which differs from each of the sets of transmission parameters represented by the data DATA that it received from a part only of the access points which interfere it, for example access points which generate the most powerful interference signals vis-à-vis the second access point b. In this case, only the interference signals generated by applying different transmission parameters from the transmission parameters MCS_u can be eliminated by the second access point b.

In another embodiment, the second access point b does not determine the set IM(b), or at least does not communicate the information INFO to the first access point b'. The first access point b' can determine (E401) the set J(b') on the basis of the powers of the signals received by the first access point b' from the different access points of the network (b in the particular example envisioned here). Such signals are for example the synchronization signals emitted by the access points of the network and received by the first access point b'. The determined set J(b') can thus comprise all the access points for which the first access point b' is capable of receiving a synchronization signal, or in a variant, the access points whose received signals have a signal level above a predetermined threshold.

In a variant, the set J(b') can be determined (E401) on the basis of the distances separating the access point b' and the other access points, the set J(b') comprising, for example, all the access points whose distance to the access point b' does not exceed a predetermined threshold. In particular, when the network NET is of C-RAN type, these distances can be sent by a central control equipment item D of the network NET to the access point b' (and where applicable to all the access points of the network). Alternatively, the distances separating the access point b' from the other points of access to the network NET can be recorded by an administrator or by an operator of the network NET, in a memory accessible by the access point b'.

By way of illustration, Monte-Carlo type simulations have been performed by the inventors, showing the gains achieved by the present invention on the capacities Cu, Cb'_b and Cd' in different situations. These simulations correspond to the embodiment described with reference to FIGS. 1 to 3 in which the system SYS includes only the first and second access points, b' and b. They are based on the assumption that as soon as the second access point b' knows, owing to the invention, the transmission parameters of the first access point b which interferes its uplink communications, it is capable of eliminating the interference signal that is generated by means of an interference elimination technique known per se. These simulations therefore rely on the capacity formulae introduced previously, averaged over several draws of positions of the terminals of the users, in a macro-cellular scenario and in a micro-cellular scenario.

Thus, first simulations were performed for a 4G network NET as shown in FIG. 1 comprising two macro-cells managed by two access points b' and b. It is recalled that macro-cells are typically envisioned to cover wide and low-density areas such as rural areas or along freeways. However, macro-cells can be used in more dense areas (i.e. areas with a higher number of terminals to connect) than rural areas.

In this first scenario, the simulations rely on the following assumptions:

- bandwidth of the transmission channel between the first and the second access point (b', b): 20 MHz
- bandwidth occupied by the radio resource RB (Resource Block) used by the first access point b' over its downlink channel and by the second access point b over the uplink channel between this access point b and the terminal u: 180 kHz
- power of emission by each access point: Pb=Pb'=46 dBm
- power of emission by the terminals u and u': Pu=Pu'=23 dBm
- gain of the antennas of the access points Gb=Gb'=11 dBi
- gain of the antennas of the terminals u and u': Gu=Gu'=0 dBi
- height of the access points: 32 meters
- distance ISD (Inter Site Distance) between the two access points: 500 m
- height of the terminals u, u', d and d': 1.5 m
- ambient noise factor n=8 dB
- spectral power density of the thermal noise: −174 dBm/Hz
- positive constant B relating to the self-interference cancellation technique: B=−100 dB (we recall that the self-interference power RSI(i) of an access point i (i denotes b or b') can be expressed as: RSI(i)=B. Pi and Pi denotes the power emitted by the access point i);
- non-zero constant $K_{i,j}$ which depends on the carrier frequency of a channel between an entity i and an entity j set equal to 1 whatever the value of i and j;
- path-loss exponent $nu_{i,j}$ over a channel between entities i and j set equal to 2 whatever the values of i and j (we recall that the gain $h_{i,j}$ of a channel between the entities i and j can be defined by $h_{i,j}=K_{i,j}*(r_{i,j})\hat{}(-nu_{i,j})$ where $r_{i,j}$ is the distance between the entities i and j);
- number of draws considered in the Monte Carlo method: $10^6$.

Table 1 summarizes the results of the simulations obtained in a macro-cellular case.

TABLE 1

| | | | |
|---|---|---|---|
| Values of the capacities Cu, Cd' and Cb'_b obtained for access points in FD (bits/s/Hz) without communication of data DATA between the access points b' and b | Cu = 0.03 | Cd' = 4.27 | Cb'_b = 6.82 |
| Values of the capacities Cu, Cd' and Cb'_b and bitrates Ru and Rd' obtained with the invention when Cd' ≤ Cb'_b | Ru = Cu = 3.99 | Rd' = Cd' 3.84 | Cb'_b = 7.20 |
| Values of the capacities Cu, Cd' and Cb'_b and bitrates Ru and Rd' obtained with the invention when Cd' > Cb'_b | Ru = Cu = 6.25 | Rd' = 4.93 Cd' = 6.38 | Cb'_b = 4.93 |

It should be noted that in the simulations entered in table 1 and given the simulation assumptions of this macro-cellular scenario (particularly the distance ISD between the access points b and b', their heights and their emissive powers Pb and Pb'), the probability of occurrence of the case where the capacity Cd' is less than or equal to the capacity Cb'_b is 83%, the probability of occurrence of the case in which the capacity Cd' is strictly greater than the capacity Cb'_b being 17%.

Note in the results entered in table 1 that the bitrate Rd' transmitted over the downlink channel when the capacity Cd' is strictly greater than the capacity Cb'_b is equal to the mean value of the capacity Cb'_b in the case where Cd'>Cb'_b.

The simulations performed show that the invention makes it possible to substantially improve the capacity Cu of the uplink in the macro-cellular case (an improvement by a factor of 13300% in the case where Cd'≤Cb'_b and a factor of 20833% in the case where Cd'>Cb'_b is observed on the results entered in the table 1). This improvement is in particular permitted owing to the communication of the data DATA representing the transmission parameters MCS_b' to the access point b, the elimination by the access point b' of the interference generated by the access point b', and the choice of transmission parameters allowing the access point b' to optimize the bitrate transmitted over its uplink.

Thus the invention very advantageously allows the use of full duplex mode and the exploitation of the gains resulting from this use in the macro-cellular case, which was not permitted by the prior art.

Other simulations have been performed for a network NET comprising two micro-cells managed by two access points b' and b. We recall that the micro-cells are conventionally used to cover dense areas such as urban zones.

In these simulations, the emissive powers of the access points Pb and Pb' are equal to 30 dBm, the two access points b and b' have a height of 10 meters, and the distance ISD between these two access points is of 200 meters. The other simulation assumptions are identical to the assumptions considered for the macro-cellular network.

The table 2 presents the results of these simulations obtained in the micro-cellular scenario:

TABLE 2

| | | | |
|---|---|---|---|
| Values of the capacities Cu, Cd' and Cb'_b obtained for access points in FD (bits/s/Hz) without communication of the data DATA between the access points b' and b | Cu = 0.72 | Cd' = 3.80 | Cb'_b = 2.07 |
| Values of the capacities Cu, Cd' and Cb'_b and the bitrates Ru and Rd' obtained with the invention when Cd' ≤ Cb'_b | Ru = Cu = 3.50 | Rd' = Cd' = 1.55 | Cb'_b = 2.81 |
| Values of the capacities Cu, Cd' and Cb'_b and the bitrates Ru and Rd' obtained with the invention when Cd' > Cb'_b | Ru = Cu = 4.88 | Rd' = 1.82 Cd' = 4.58 | Cb'_b = 1.82 |

Note that given the simulation assumptions of this micro-cellular scenario (particularly the distance ISD between the access points b and b', their height and their emissive powers Pb and Pb'), the probability of occurrence of the case in which the capacity Cd' is less than or equal to the capacity Cb'_b is 26%, the probability of occurrence of the case in which the capacity Cd' is strictly greater than the capacity Cb'_b being 74%.

The simulations show that the invention makes it possible to improve the capacity Cu of the uplink by a factor of 386% in the case where the capacity Cd' is less than or equal to the capacity Cb'_b.

In the case in which the capacity Cd' is greater than the capacity Cb'_b, the capacity Cu of the uplink is improved by a factor of 578%.

FIG. 6 shows functional architectures, according to an embodiment of the invention, of a system SYS in accordance with the invention including the first and second access points b' and b.

In the embodiment illustrated in FIG. 6, the first access point b' includes a first network device in accordance with the invention and implements a communication method in accordance with the invention. In this mode, the second access point b includes a second network device in accordance with the invention and implements a selection method in accordance with the invention.

The system SYS includes the two access points b' and b which are here sharing a same wireless communication resource RB. The first access point b' constitutes an interferer access point for the second access point b: it uses over its downlink channel DL' a same radio resource RB as the terminal u uses to communicate via an uplink channel UL, with the second access point b.

The first access point b' comprises a communication channel COM' configured to send to the second access point b the data DATA representing the set MCS_b' of the transmission parameters used by the first access point b' over one of its downlink channels, such as its downlink channel DL' toward the terminal d'.

The second access point b implements an interference cancellation method (for example a method of successive interference cancellation or SIC) and comprises:

a communication module COM able to or configured to receive, coming from the first access point b', the data DATA relating to the first set MCS_b' of transmission parameters used by the first access point b' over at least one of its downlink channels, such as the channel DL';

a determination module PROC configured to select on the basis of the list L of transmission parameters, as a function of the received data DATA, the second set MCS_u of transmission parameters to be used by the terminal u on the uplink channel UL between this terminal u and the second access point b, at least one parameter of the second set MCS_u being different from the parameters of the first set MCS_b';

the communication module COM being configured to send to the terminal u a command CMD to use the second set of parameters MCS_u.

The second access point b further includes a module for processing signals SIGN to eliminate, knowing (and using) the received data DATA and the second set of parameters MCS_u, the interference INT generated by the first access point b' on the uplink channel UL of the second access point b.

In the mode described previously with reference to FIG. 6, the first access point b' includes a first network device in accordance with the invention and implements a method of communication in accordance with the invention. Alternatively, the communication method can be implemented by another entity of the network NET, separate from the first access point b', such as for example in the case of a centralized network NET, by a control or management entity D of the network NET. In this case, the system SYS includes the two access points b' and b, as well as this entity D of the network NET. This then comprises the functional module COM' described previously.

In the mode described with reference to FIG. 6, the second access point b includes a second network device in accordance with the invention and implements a selection method in accordance with the invention. Alternatively, the selection method can be implemented by another entity of the network NET, separate from the second access point b, such as for example in the case of a centralized network NET, by a control or management entity D of the network NET. In this case, the system SYS includes the two access points b' and b, as well as this entity D of the network NET. This then comprises the functional modules COM and PROC described previously.

Note that in the case of a centralized network NET, the first network device according to the invention and the second network device according to the invention can be contained in the same control entity D.

In the embodiments described here, the first device (whether it is contained in an access point b' or in a central management entity D of the network NET) and the second device (whether it is contained in an access point b or in a central management entity D of the network NET) in accordance with the invention each have the hardware architecture of a computer, as illustrated in FIG. 7.

The architecture of the first and second device particularly comprises a processor 7, a random access memory 8, a read-only memory 9, a non-volatile flash memory 10 in a particular embodiment of the invention, and communication means 11. Such means are known per se and are not described in further detail here.

The read-only memory 9 of the first device according to the invention constitutes a recording medium in accordance with the invention, readable by the processor 7 and on which is recorded a computer program ProgTx in accordance with the invention.

The memory 10 of the first device makes it possible to record variables used for executing the steps of the communication method according to the invention, such as the first set of parameters MCS_b', the capacity of the downlink channel, Cd', the capacity of the channel between the access points, Cb'_b, the data DATA, the information INFO and the set of the interfered points J(b').

The computer program ProgTx defines functional and software modules here, configured to communicate transmission parameters. These functional modules, such as the communication module COM', rely on and/or command the hardware elements 7-11 of the first device mentioned previously.

The read-only memory 9 of the second device according to the invention constitutes a recording medium in accordance with the invention, readable by the processor 7 and on which is here recorded a computer program ProgRx according to the invention.

The memory 10 of the second device makes it possible to record variables for executing the steps of the selection method according to the invention, such as the data DATA, the list L, the second set of parameters MCS_u, and the set of interferer points IM(b).

The computer program ProgRx defines hardware and software functional modules here, configured to select transmission parameters. These functional modules such as the communication module COM and the determination module PROC, rely on and/or command the hardware elements 7-11 of the second device mentioned previously.

The invention claimed is:

1. A method of communication by a first device of a wireless communication network comprising a first access point to the network and at least one second access point to the network, the method comprising:

generating, by the first access point, during a communication over a downlink channel, set up with a first terminal, an interference signal affecting at least one communication of the at least one second access point over at least one uplink channel set up with at least one second terminal, and sending by the first device of the network to the at least one second access point at least one item of data representing a set of transmission parameters used by the first access point during said communication with the first terminal over the downlink channel, wherein same, adjacent or neighboring radio resources are used on the communication over the downlink channel between the first access point and the first terminal and on the communication over the at least one uplink channel between the at least one second terminal and the at least one second access point.

2. The method of claim 1 wherein the first access point uses during the communication over the downlink channel, a resource used by the at least one second access point during the at least one communication over the at least one uplink channel.

3. The method of claim 1 further comprising:

determining the set of transmission parameters as a function of an estimate of a quality of at least one wireless propagation channel between the first access point and the at least one second access point, the set of transmission parameters being determined such as to allow the at least one second access point to detect in a signal received thereby, comprising a signal transmitted over the uplink channel by the second terminal, the interference signal created by the first access point during the communication over the downlink channel.

4. The method of claim 3 wherein the estimate of the quality of at least one propagation channel comprises an estimate of a capacity of the at least one propagation channel or an estimate of a signal-to-interference-plus-noise ratio over the at least one propagation channel.

5. The method of claim 1 wherein:

in response to a determination that a capacity of the downlink channel is less than or equal to a capacity of the at least one propagation channel between the first and the at least one second access point, the set of transmission parameters is determined such as to maximize a value of a bitrate transmitted over the downlink channel within the limit of the capacity of the downlink channel; and/or upon a determination that the capacity of the downlink channel is greater than the capacity of at least one propagation channel between the first access point and the at least one second access point, the set of transmission parameters is determined such as to maximize the bitrate value transmitted over said downlink channel, within the limit of the capacity of the propagation channel between the first and the second access point.

6. The method of claim 1 further including:

obtaining at least one item of information identifying at least one access point of the interferer of the network generating during a communication over a downlink channel an interference signal affecting a communication of another access point over an uplink channel (UL);

determining, on the basis of the at least one item of information obtained, a set of interfered access points for which the first access point is identified as an interferer access point, the at least one second access point belonging to the determined set.

7. The method of claim 6 further comprising:

determining at least one access point of the interferer network for the second access point, generating over a downlink channel set up with a terminal with an interference signal affecting a communication of the second access point over the uplink channel; and supplying to a first device of the network at least one item of information identifying the at least one determined interferer access point and intended to be used by the first device to determine a set of transmission parameters of the at least one determined interferer access points.

8. The method of claim 1 wherein the sets of transmission parameters include at least one parameter from among:

a modulation scheme;

an encoding scheme; and a power level.

9. The method of claim 1 wherein at least the second access point is operating in Full-Duplex mode.

10. A method of selection by a second device of a wireless communication network, of a second set of transmission parameters intended to be used during a communication by a second terminal over an uplink channel set up with a second access point to the network, this communication being affected by at least one interference signal generated by at least one first access point of the wireless communication network during at least one communication over at least one downlink channel set up with at least one first terminal (d'), the method comprising:

obtaining at least one item of data representing at least a first set of transmission parameters used by the at least one first access point over the at least one downlink channel;

determining as a function of the at least one item of data obtained, the second set of transmission parameters, the second set of transmission parameters being different from the at least one first set of transmission parameters; and using the second set of transmission parameters during the communication affected by the at least one interference signal, wherein same, adjacent or neighboring radio resources are used on the communication over the downlink channel between the first access point and the first terminal and on the communication over the at least one uplink channel between the at least one second terminal and the at least one second access point.

11. The method of claim 10 wherein the second set of transmission parameters is determined such as to maximize a bitrate transmitted over an uplink channel within the limit of a capacity of the uplink channel.

12. The method of claim 10 wherein the sets of transmission parameters include at least one parameter from among:

a modulation scheme;

an encoding scheme; and a power level.

13. The method of claim 10 wherein at least the second access point is operating in Full-Duplex mode.

14. A first device of a wireless communication network comprising a first access point to the network and at least one second access point to the network, the first access point generating, during a communication over a downlink channel set up with a first terminal, an interference signal affecting at least one communication of the at least one second access point over at least one uplink channel set up with at least one second terminal, the first device comprising a processor and configured to:

send to the at least one second access point at least one item of data representing a set of transmission parameters used by the first access point during the communication with the first terminal over the downlink channel being affected by the interference signal, wherein same, adjacent or neighboring radio resources are used on the communication over the downlink channel between the first access point and the first terminal and on the communication over the at least one uplink channel between the at least one second terminal and the at least one second access point.

15. A second device of a wireless communication network configured to select for a second access point to the network a second set of transmission parameters intended to be used during a communication by a second terminal over an uplink channel set up with the second access point, this communication being affected by at least one interference signal generated by at least a first access point to the wireless communication network during at least one communication over at least one downlink channel set up with at least one first terminal, the second device comprising a processor, the second device configured to:

obtain at least one item of data representing at least one first set of transmission parameters used by the at least one first access point over the at least one downlink channel during said at least one communication over said at least one downlink channel;

determine as a function of the at least one item of data obtained, the second set of transmission parameters, this second set of transmission parameters being different from the at least one first set of transmission parameters; and use the second set of transmission parameters during a communication by a second terminal over an uplink channel set up with the second access point, wherein same, adjacent or neighboring radio resources are used on the communication over the downlink channel between the first access point and the first terminal and on the communication over the at least one uplink channel between the at least one second terminal and the at least one second access point.

16. A system in a wireless communications network, comprising:

a first access point of the network; and at least one second access point of the network;

the first device of claim 12; and at least one second device of the wireless communication network configured to select for the second access point to the network a second set of transmission parameters intended to be used during a communication by a second terminal over an uplink channel set up with the second access point, this communication being affected by at least one interference signal generated by at least the first access point to the wireless communication network during at least one communication over at least one downlink channel set up with at least one first terminal, the second device comprising a processor, the second device configured to:

obtain at least one item of data representing at least one first set of transmission parameters used by the at least one first access point over the at least one downlink channel during said at least one communication over said at least one downlink channel; and determine as a function of the at least one item of data obtained, the second set of transmission parameters, this second set of transmission parameters being different from the at least one first set of transmission parameters.

17. The system of claim 16 wherein the first device of the network is contained in the first access point and/or the second device of the network is contained in the second access point.

18. The system of claim 17 wherein the first device of the network and the second device of the network are contained in a central management entity of the network able to communicate with the first access point and the second access point.

* * * * *